United States Patent
Uehara

[11] 3,901,569
[45] Aug. 26, 1975

[54] ROLLER THRUST BEARING
[75] Inventor: Takeo Uehara, Uozu, Japan
[73] Assignee: Yoshida Kogyo Kabushiki Kaisha, Tokyo, Japan
[22] Filed: Aug. 27, 1974
[21] Appl. No.: 500,918

[30] Foreign Application Priority Data
Aug. 27, 1973 Japan.............................. 48-100705
Aug. 27, 1973 Japan.............................. 48-100706

[52] U.S. Cl. ........................ 308/230; 16/21; 16/91; 308/16; 308/174; 308/238
[51] Int. Cl.² ......... B60B 33/00; E05D 13/00; F16C 17/10; F16C 19/14
[58] Field of Search .............. 16/21, 26, 46, 91, 98; 308/16, 141, 149, 150, 157, 161, 162, 163, 164, 174, 175, 230, 238

[56] References Cited
UNITED STATES PATENTS
2,035,485    3/1936    Kuhlengel............................ 308/230

Primary Examiner—M. Henson Wood, Jr.
Assistant Examiner—Howard Beltran
Attorney, Agent, or Firm—Bucknam and Archer

[57] ABSTRACT

A thrust bearing having a pair of synthetic resin blocks and metallic rolling elements rotatably carried by a synthetic resin retainer and rotatably disposed between the two blocks at uniform intervals. Those surfaces of the blocks which face the metallic rolling elements have circular bearing grooves for rotatably receiving the upper and lower portions of each of the metallic rolling elements, respectively. A shaft rotatably extends through the blocks and the retainer, which shaft has at least one expanded portion engaging the top or bottom wall of the combination of the two blocks, and the opposite end of the shaft is secured to a mounting plate engaging the bottom or top wall of the combination.

2 Claims, 5 Drawing Figures

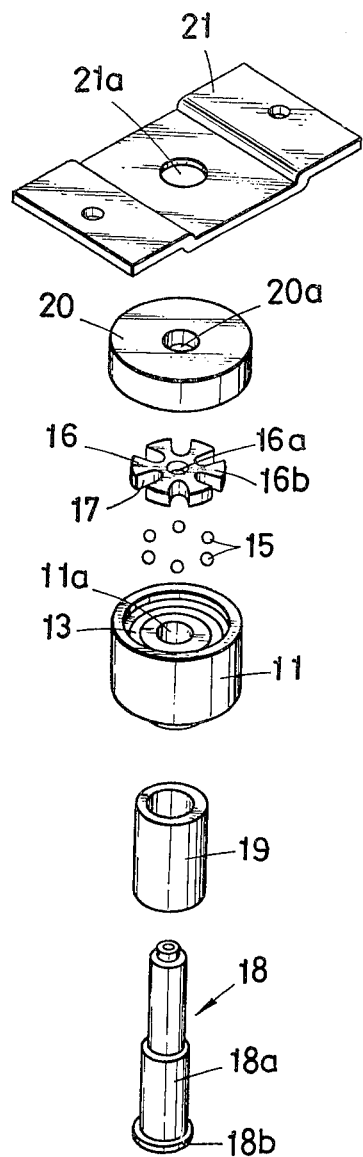
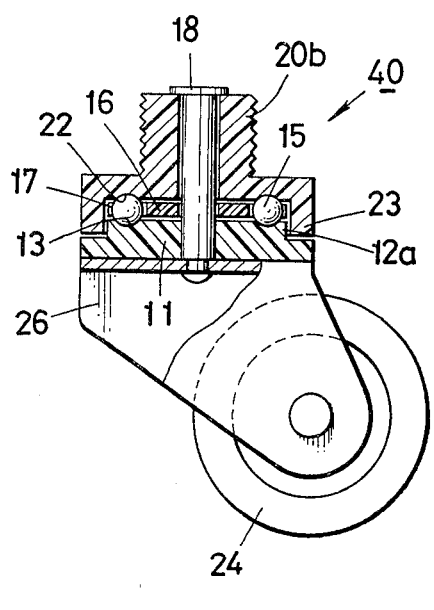
FIG. 3
FIG. 4

ROLLER THRUST BEARING

BACKGROUND OF THE INVENTION

This invention relates to a thrust bearing, and more particularly to a thrust bearing structure suitable for runners for horizontally sliding doors or for furniture castors, which is characterized by a minimum of operating noise and a high resistance to mechanical wear.

Conventional thrust bearings for runners for horizontally sliding doors and furniture castors are made of metallic material, so that such conventional bearings have the drawback that they tend to produce a relatively loud noise during operation and they are prone to wear out due to the metal-to-metal friction therein.

SUMMARY OF THE INVENTION

Therefore, it is an object of the present invention to provide an improved thrust bearing which will mitigate the above drawback of the conventional metallic thrust bearings adapted for horizontally sliding doors and furniture castors.

A thrust bearing structure according to the present invention consists of a pair of synthetic resin blocks, between which metallic rolling elements carried by a synthetic resin retainer are rotatably disposed. The metallic rolling elements are balls or rollers. Those surfaces of the blocks which come in contact with the rolling elements have circular bearing grooves, so as to guide the rolling of the elements by receiving the upper and lower portions thereof, respectively. A shaft is rotatably disposed in and through centrally extending bores of the synthetic resin blocks and the synthetic resin retainer, which are concentric with the circular bearing holes of the blocks.

With the thrust bearing of the aforesaid construction, the metallic rolling elements are held in contact with the synthetic resin material of the blocks and the retainer, so that the noise during the rolling thereof is much lower than that of the rolling elements in the conventional metallic thrust bearings having a metal-to-metal contact. Furthermore, when foreign matters, such as sand particles, enter the space between the two blocks, such particles are buried in the synthetic resin material of the blocks and the retainer, so that wear of the rolling elements can be held to an absolute minimum. Thus, the service life of the thrust bearing is considerably improved.

The thrust bearing of the present invention is particularly suitable for a runner of a horizontally sliding door, because mechanical load applied to the runner in a radial direction can be borne by the rotatable synthetic resin blocks and the shaft.

For a better understanding of the invention, reference is now made to the accompanying drawings.

BRIEF DESCRIPTION OF THE DRAWINGS

FIG. 3 is an exploded view of the runner for the horizontally sliding door;

FIG. 4 is a partially cutaway elevation of a furniture castor according to the present invention.

Like parts are designated by like numerals throughout the different views of the drawings.

DESCRIPTION OF THE PREFERRED EMBODIMENT

Figure 1:
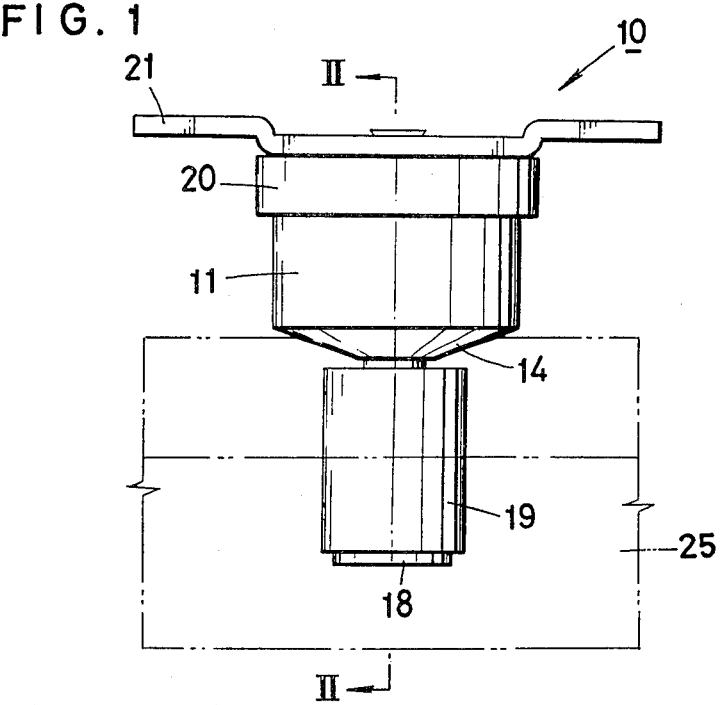
FIG. 1 is an elevation of a runner for a horizontally sliding door, into which a thrust bearing according to the present invention is incorporated.
Figure 2:
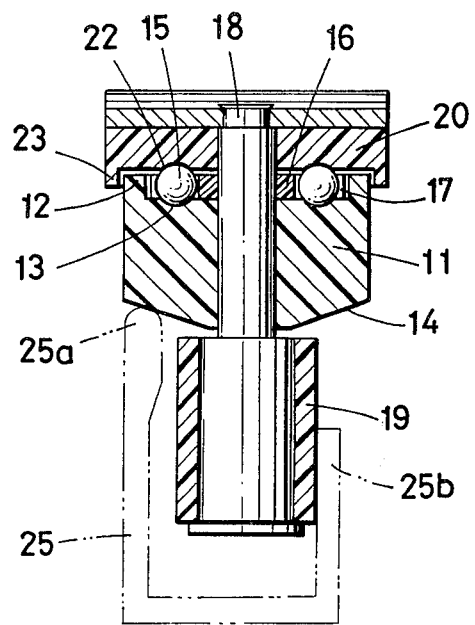
FIG. 2 is a sectional view taken along the line II—II of FIG. 1.

Referring now to FIGS. 1 to 3, a runner 10 for a horizontally sliding door (not shown) is secured to the door by a mounting plate 21, for instance, to the bottom side of the door. A thrust bearing incorporated in the runner 10 comprises a lower block 11 made of synthetic resin, metallic rolling elements 15, e.g., metallic balls or rollers, a synthetic resin retainer 16 having radial openings 17 for rotatably carrying the rolling elements 15, one at each opening, so as to rotatably position the rolling elements 15 in a circular bearing groove 13 formed in the top surface of the lower block 11 at uniform intervals, an upper block 20 made of synthetic resin and having a circular bearing groove 22 movably receiving the top portions of the metallic rolling elements 15, and a shaft 18 extending through the central shaft holes 11a, 16a, 20a and 21a of the lower block 11, the retainer 16, the upper block 20, and the mounting plate 21, respectively. The top end of the shaft 18 is secured to the mounting plate 21 by any suitable conventional means, e.g., by caulking or bolting.

In the embodiment shown in FIGS. 1 to 3, the shaft 18 has a large diameter lower portion 18a rotatably carrying a hollow cylindrical roller 19 and a diskshaped lower end 18b rotatably supporting the cylindrical roller 19. The bottom surface 14 of the lower block 11 is finished in the form of a truncated cone, for the purpose to be described hereinafter. To enclose the space between the upper block 20 and the lower block 11, the lower block 11 has a cylindrical edge wall 13 extending upwardly from the top end thereof into the space and the upper block 20 has a cylindrical fringe wall 23 depending from the bottom thereof so as to surround the outside of the cylindrical edge wall 12 opposite to the shaft 18, as shown in FIG. 2. Thus, any foreign matters, such as dust particles, are prevented from entering into the space between the upper block 20 and the lower block 11.

Radially inward and outward movement of the rolling elements 15, relative to the shaft 18, is restricted by the combination of the bearing grooves 13, 22 and the radial openings 17 of the synthetic resin retainer 16. Arms 16a formed of a synthetic resin alternate with adjacent openings 17 of the retainer 16, such that each metallic rolling element 15 comes in contact with the synthetic resin alone and not in metal-to-metal contact with the adjacent metallic rolling elements. In FIGS. 1 to 3, the metallic rolling elements 15 are illustrated in the form of a ball so that, the bearing grooves 13 and 22 of the blocks 11 and 20 are preferably arcuate in cross section.

The runner 10 for a horizontally sliding door (not shown) engages the top of a tall vertical wall 25a of a channel-shaped guide rail 25 at the bottom surface 14 of the lower block 11, and the hollow cylindrical roller 19 rotatably engages the inner surface of a short vertical wall 25b of the channel-shaped guide rail 25. A thrust load applied to the thrust bearing of the runner 10 is decomposed at the surface 14 of the block 11 into two components; namely, one component perpendicular to the surface 14 tending to urge the lower block 11 against the tall vertical wall 25a of the guide rail 25, and another component tending to urge the roller 19 against the short vertical wall 25b of the guide rail 25. Thus, the guiding function of the runner 19 is stabilized, bearing the thrust load by the tall vertical wall 25a of the guide rail 25. Furthermore, the truncated cone shape of the bottom wall 14 of the lower block 11 results in a kind of wedge action, which further stabilizes the engagement between the runner 10 and the guide rail 25, so that backlash of the runner 10 and the risk of slipping off of the runner 10 from the guide rail 25 can be eliminated.

The metallic rolling elements 15 ensure smooth and substantially noiseless rotation of the synthetic resin lower block 11 relative to the shaft 18, and the hollow cylindrical synthetic resin roller 19 also smoothly rotates about the shaft 18 in a substantially noiseless manner, so that the runner 10 slides smoothly along the guide rail 25. The cylindrical edge wall 12 and the cylindrical fringe wall 23 prevent rain water and dust particles from entering into the proximity of the metallic rolling elements 15. If, however, rain water should come in contact with the metallic rolling elements 15, the synthetic resin material of the blocks 11, 20 and the retainer 16 serves to polish the surfaces of the metallic rolling elements 15 so as to prevent the possible corrosion of the elements 15.

Figure 5:
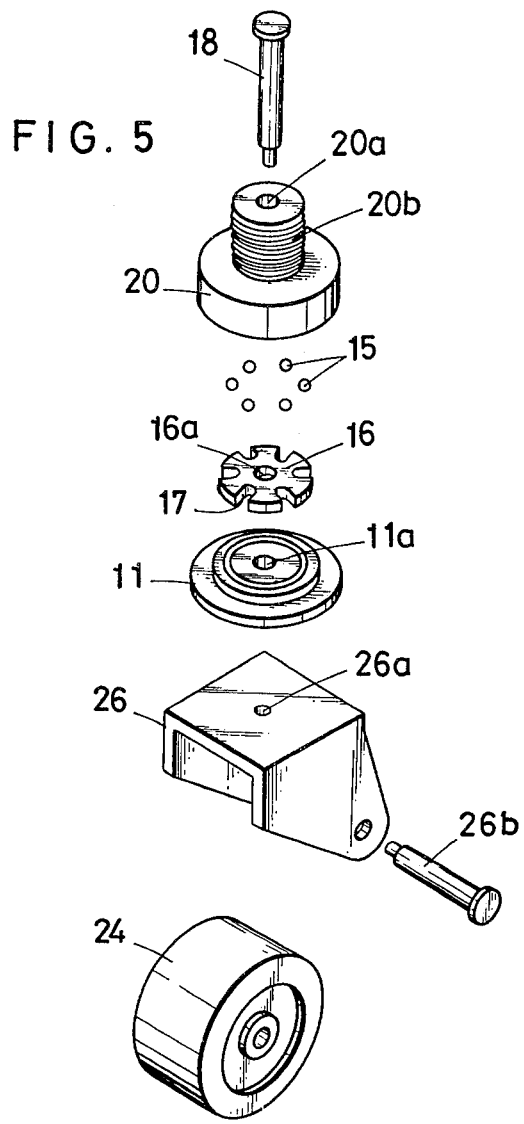
FIG. 5 is an exploded view of the furniture castor.

FIGS. 4 and 5 illustrate a furniture castor 40, according to the present invention, which includes the aforesaid construction of the thrust bearing. An upper block 20 made of synthetic resin has a central bore 20a and a threaded projection 20b. A shaft 18 extends through the central bore 20a, and the top end of the shaft 18 has a disk-shaped expanded portion which rests on the top surface of the upper block 20. The projection 20b is threadedly engageable with the lower end of a furniture (not shown). The shaft 18 also extends through the central bore 16a of a retainer 16 and the central bore 11a of a lower block 11, both of which retainer 16 and the block 11 are made of synthetic resin. There is formed a space defined between the upper block 20 and the lower block 11, where metallic rolling elements 15 carried by the radial openings 17 of the retainer 16 are disposed in a rotatable manner. The metallic rolling elements 15 rollingly engage a circular bearing groove 22 formed in the bottom surface of the upper block 20 and another circular bearing groove 13 formed in the top surface of the lower block 11. The metallic rolling elements 15 may be balls or rollers, and the circular bearing grooves 13 and 22 have a cross section which suits the particular metallic elements employed in the thrust bearing. A bracket 26 has a flat top surface which engages the flat bottom surface of the lower block 11, and the lower end of the shaft 18 is secured in position in a central bore 26a of the bracket 26. A wheel shaft 26b extends across opposite side walls of the bracket 26, so as to rotatably carry a wheel 24, preferably made of a suitable non-metallic material, e.g., elastomeric or plastic material. To close the space between the upper block 20 and the lower block 11 for preventing foreign matters from entering therein, the top portion of the lower block 11 has a reduced diameter portion 12a and the upper block 20 has a cylindrical fringe wall 23 depending from the bottom thereof so as to fit in the reduced diameter portion 12a of the lower block 11, as shown in FIG. 4.

It is apparent to those skilled in the art that the furniture castor 40 of the aforesaid construction has all the features of the thrust bearing of the present invention including the low noise operation, the minimization of mechnical wear of the metallic rolling elements, and the ease of manufacture thereof.

What is claimed is:

1. A thrust bearing structure comprising:
   a mounting plate adapted to be connected to a horizontally sliding door;
   a shaft having a top end thereof secured to said mounting plate, a large diameter portion formed at the lower part thereof, and a disk-shaped portion formed at the lower end thereof so as to radially extend further than the outer periphery of said large diameter portion of the shaft;
   a cylindrical roller rotatably fitted on the large diameter portion of the shaft through a central bore thereof in a concentric manner therewith and supported by said disk-shaped portion of the shaft;
   a lower block made of synthetic resin and having a central bore through which said shaft extends so as to rotatably hold said lower block above said large diameter portion thereof, said lower block having a circular bearing groove formed in the top surface thereof so as to be concentric with said central bore;
   a plurality of metallic rolling elements rollingly fitted in said circular bearing groove of the lower block;
   a retainer made of synthetic resin and having a central bore through which the shaft extends so as to rotatably carry said retainer on the top surface of the lower block, said retainer having uniformly spaced radial openings adapted to retain said rolling elements at uniform intervals in said bearing groove; and
   an upper block made of synthetic resin and having a central bore through which said shaft extends so as to rotatably carry said upper block above said retainer, said lower block having a circular bearing groove corresponding to the bearing groove of the lower block.

2. A thrust bearing structure as defined in claim 1, wherein said lower block has a cylindrical edge wall projecting upwardly from the periphery of the top surface thereof into a space between said lower block and said upper block, and said upper block has a cylindrical fringe wall depending from the lower end of the upper block so as to surround the outside of the cylindrical edge wall of the lower block relative to said shaft.

* * * * *